United States Patent

Okazawa

[11] Patent Number: 5,937,148
[45] Date of Patent: Aug. 10, 1999

[54] PRINTING SYSTEM HAVING AN INTERFACE SECTION FOR INDEPENDENTLY INFORMING AN EXTERNAL UNIT OF STATUS INFORMATION OF A PRINTING APPARATUS

[75] Inventor: Takashi Okazawa, Yokohama, Japan

[73] Assignee: Canon Kabushiki Kaisha, Tokyo, Japan

[21] Appl. No.: 08/958,740

[22] Filed: Oct. 27, 1997

Related U.S. Application Data

[63] Continuation of application No. 08/354,116, Dec. 6, 1994.

[30] Foreign Application Priority Data

| Dec. 9, 1993 | [JP] | Japan | 5-309141 |
| Sep. 30, 1994 | [JP] | Japan | 6-236231 |
| Nov. 4, 1994 | [JP] | Japan | 6-271509 |

[51] Int. Cl.⁶ .................................................. G06F 13/00
[52] U.S. Cl. ........................... 395/112; 395/113; 395/114
[58] Field of Search .................................... 395/112, 113, 395/114, 837, 838, 839; 358/442, 468, 434, 435, 436, 438, 439, 296, 401

[56] References Cited

U.S. PATENT DOCUMENTS

| 4,740,096 | 4/1988 | Nakanishi | 400/663 |
| 5,220,674 | 6/1993 | Morgan et al. | 395/837 |
| 5,247,623 | 9/1993 | Sun | 395/286 |
| 5,287,194 | 2/1994 | Lobiondo | 395/114 |
| 5,293,196 | 3/1994 | Kaneko et al. | 355/206 |
| 5,321,478 | 6/1994 | Nakamura et al. | 355/208 |
| 5,420,667 | 5/1995 | Kaneko et al. | 355/206 |
| 5,457,516 | 10/1995 | Kim | 355/208 |
| 5,502,546 | 3/1996 | Muto | 355/208 |
| 5,521,686 | 5/1996 | Muto . | |
| 5,528,346 | 6/1996 | Kim et al. | 355/204 |
| 5,580,177 | 12/1996 | Gase et al. | 395/114 |
| 5,581,668 | 12/1996 | Oida et al. | 395/112 |

FOREIGN PATENT DOCUMENTS

| 0317072 | 5/1989 | European Pat. Off. . | |
| 0526189 | 2/1993 | European Pat. Off. . | |
| 4-189063 | 7/1992 | Japan | H04N 1/29 |
| 4-355556 | 12/1992 | Japan | H04N 1/00 |
| 5-95463 | 4/1993 | Japan | H04N 1/32 |

OTHER PUBLICATIONS

IBM Tech. Discl. Bull., vol. 34, No. 10A, Mar. 1, 1992, pp. 192–193, "Use of a graphical user interface for printers".

*Primary Examiner*—Scott Rogers
*Attorney, Agent, or Firm*—Fitzpatrick, Cella, Harper & Scinto

[57] ABSTRACT

A printing apparatus of the present invention includes a controller section for generating a bit image on the basis of printing data, an engine section for forming a visible image on a recording medium on the basis of the bit image from the controller section, and an interface section for performing data communication with a host computer and controlling supply and cut-off of power to the controller section and the engine section on the basis of command data from the host computer.

54 Claims, 9 Drawing Sheets

PRINTING SYSTEM HAVING AN INTERFACE SECTION FOR INDEPENDENTLY INFORMING AN EXTERNAL UNIT OF STATUS INFORMATION OF A PRINTING APPARATUS

This application is a continuation of application Ser. No. 08/354,116 filed Dec. 6, 1994.

BACKGROUND OF THE INVENTION

The present invention relates to a printing apparatus having a power saving function (sleep mode) for suppressing power consumption in a non-printing state, a system having the same, and a method of controlling the printing apparatus.

In recent years, printing apparatuses of this type, e.g., page printers represented by laser beam printers have become rapidly widespread.

Generally, an apparatus of this type is constituted by a printer controller for receiving printing data to generate a printing image and at the same time controlling the entire apparatus, and a printer engine for actually performing printing. Since the printer engine has a thermal fixing unit, the power consumption is undesirably increased.

For this reason, in a printing standby state, in other words, when a predetermined period of time has elapsed after supply of printing data from a host unit (e.g., host computer) is cut off, power to the printer engine, particularly to the thermal fixing unit is stopped, thereby appropriately suppressing the power consumption. That is, this printer has a sleep mode (or power save mode).

Setting and canceling of the sleep mode are controlled by the printer controller (CPU in the printer controller). More specifically, upon power-on, or when a predetermined period of time has elapsed after completion of printing processing, and no further printing data is received, power supply to the printer engine is stopped. If printing data is received in the sleep mode, power supply to the printer engine is resumed.

Although the power consumption can be surely reduced in the sleep mode as compared to an actual printing mode, power supply to the printer controller never stops. Additionally, the CPU and various circuits requiring a large power consumption are connected to the printer controller through buses. Taking these factors into consideration, no sufficient power saving effect can be obtained yet.

SUMMARY OF THE INVENTION

The present invention has been made to solve the above problem, and the first to eighth inventions according to the present invention have as their object to provide a printing apparatus in which an interface section for performing communication processing with a host unit is separated from a controller section, and the interface section controls the power supply states of the controller section and a printer engine section to control the power supply states of the controller section and the printer engine section, both of which have a large power loss, such that the printing apparatus itself further saves power consumption in a sleep state while ensuring a communication state with the host unit.

The first invention according to the present invention comprises an interface section for performing data communication with a host unit, a controller section for generating a printing image based on printing data sent from the host unit through the interface section, an engine section for performing recording on a recording medium on the basis of the printing image from the controller section, and a power supply for always supplying power to the interface section while a power supply switch is in an ON state, wherein the interface section has control means for controlling power supply from the power supply to the controller section and the engine section on the basis of data received from the host unit.

In the second invention according to the present invention, the control means controls power supply such that power supply from the power supply to the controller section is started upon reception of a predetermined command from the host unit, and power supply from the power supply to the controller section is stopped upon reception of a predetermined command from the controller section.

In the third invention according to the present invention, the interface section has informing means for informing a status of a printing apparatus main body to the host unit.

In the fourth invention according to the present invention, the interface section communicates with a plurality of host units through a network.

In the fifth invention according to the present invention, the host unit preferentially selects a printing apparatus whose printing apparatus main body is set in a standby state, which is informed by the informing means, before a printing apparatus in a sleep state.

In the sixth invention according to the present invention, when the host unit recognizes that a plurality of printing apparatuses are set in the standby state, the host unit sends a command for setting one of the printing apparatuses in the sleep state to the interface section.

In the seventh invention according to the present invention, the interface section can be freely attached/detached to/from the printing apparatus main body.

In the eighth invention according to the present invention, the interface section can be externally connected through an external interface port of a printing apparatus main body.

In the first invention according to the present invention, the control means of the interface section controls power supply from the power supply to the controller section and the engine section on the basis of data received from the host unit to limit power supply to the controller section and the engine section in the sleep state except for power supply in the interface section, thereby further saving power.

In the second invention, the control means controls power supply such that power supply from the power supply to the controller section is started upon reception of a predetermined command from the host unit, and power supply from the power to the controller section is stopped upon reception of a predetermined command from the controller section. In accordance with a command from the host unit, the state of the printing apparatus can be reversibly switched from the sleep state to the standby state or from the standby state to the sleep state.

In the third invention, the informing means of the interface section informs the status of the printing apparatus main body to the host unit such that the host unit can properly determine the current printer status of the printing apparatus.

In the fourth invention, the interface section communicates with the host unit through a network. Upon reception of a command from any one of the host units, power supply to the controller section and the engine section in the sleep state can be limited except for power supply in the interface section, thereby further saving power.

In the fifth invention, in accordance with information from the interface section, the host unit preferentially selects a printing apparatus whose printing apparatus main body is set in the standby state before a printing apparatus in the sleep state, thereby determining a printing apparatus capable of performing printing processing as quickly as possible.

In the sixth invention, when the host unit recognizes that a plurality of printing apparatuses whose printing apparatus main bodies are set in the standby state are present, the host unit sends a command for setting one of the printing apparatuses in the sleep state to the interface section. With this operation, regardless of changes in status of each printing apparatus, a printing apparatus capable of performing printing processing can be determined as quickly as possible while printing apparatuses not subjected to printing are set in the sleep state.

In the seventh invention, the interface section can be freely attached/detached to/from the printing apparatus main body, thereby coping with expansion or modification of the interface section.

In the eighth invention, the interface section can be externally connected through the external interface port of the printing apparatus main body, thereby externally expanding the function of the interface section to a conventional printing apparatus.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An embodiment according to the present invention will be described below in detail with reference to the accompanying drawings.

<Description of Apparatus Arrangement>

Figure 1:
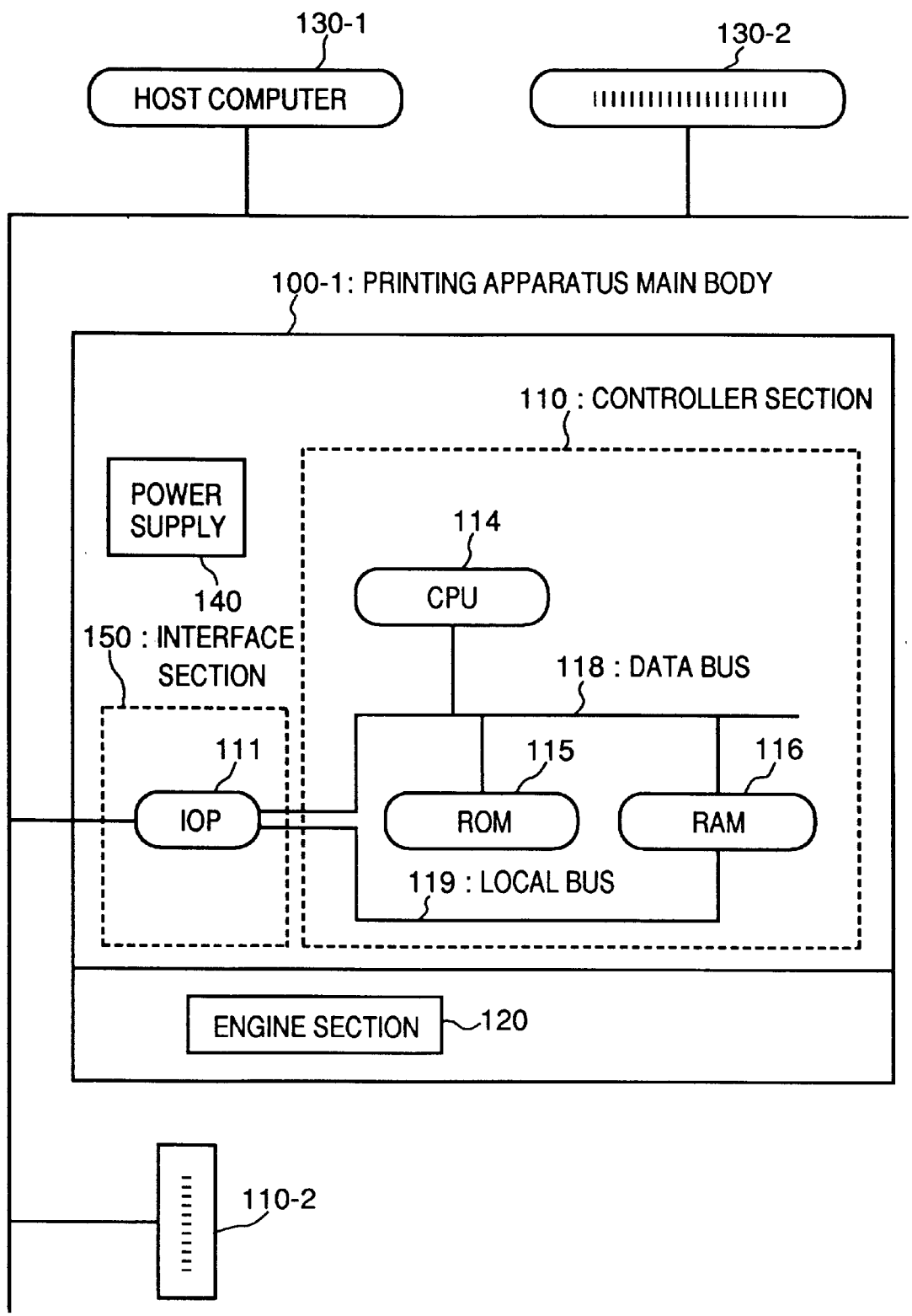
FIG. 1 is a block diagram showing the circuit arrangement of a printing apparatus according to an embodiment of the present invention.

FIG. 1 is a block diagram showing the circuit arrangement of a printing apparatus showing an embodiment of the present invention.

Referring to FIG. 1, reference numerals 100-1 and 100-2 denote printing apparatus main bodies. As shown in FIG. 1, the printing apparatuses of this embodiment are placed in an environment in which a plurality of printing apparatuses are connected to a plurality of host computers 130-1 and 130-2.

The printing apparatus main body of this embodiment is mainly constituted by a controller section 110 and an engine section 120.

The controller section 110 serves as a printer controller for receiving printing data, a control command, and the like from an external equipment, accordingly preparing bit map data in an image memory (not shown), and transferring the data to the engine section 120 as a video signal. The engine section 120 receives the video signal from the controller section 110 and forms a visible image on a sheet surface from the video signal (to be described later in detail).

The controller section 110 communicates with the engine section 120 to externally inform the status of the engine section 120.

The controller section 110 will be described below in detail.

The controller section 110 has a host interface processor (I/O processor; to be referred to as an IOP hereinafter) 111, a CPU 114, a ROM 115, a RAM 116, a data bus (bus) 118, and a local bus 119.

As described above, although not illustrated, an image memory for developing a bit map image, an interface to the engine section 120, and an interface to an operation panel (not shown) are also provided on the bus 118.

The IOP 111 transmits/receives data to/from an external apparatus (host computer) and has an intelligence to some extent as described later. A program for interpreting printing data in various printer languages to generate a bit image, a program for controlling the entire apparatus, and font data are stored in the ROM 115.

The RAM 116 always receives power during the power-ON state of the apparatus main body and is used as a work area of the CPU 114. The RAM 116 is also used as a work area for information processing, or used to save various printing parameters and store the status information of the printing apparatus.

Data, an address, and a control signal, which are transmitted in the controller, flow through the bus 118. The IOP 111 can refer to or write-access the RAM 116 through the local bus 119 (not through the CPU 114 and the bus 118) which is directly connected to the RAM 116.

Reference numeral 140 denotes a power supply turned on/off by a power supply switch (not shown). Normally, power having a necessary potential is always supplied to an interface section 150.

A correspondence between this embodiment and each means of the first to eighth inventions and the function thereof will be described below with reference to FIG. 1.

The first invention has the interface section 150 for performing data communication with the host unit 130-1 or 130-2, the controller section 110 for generating a printing image based on printing data sent from the host unit 130-1 or 130-2 through the interface section 150, the engine section 120 for performing recording on a recording medium on the basis of the printing image from the controller section 110, and the power supply 140 for always supplying power to the interface section 150 during the ON state of the power supply switch. The interface section 150 has the control means (IOP 111) for controlling power supply from the power supply 140 to the controller section 110 and the engine section 120 on the basis of data received from the host unit 130-1 or 130-2. The IOP 111 controls power supply from the power supply 140 to the controller section 110 and the engine section 120 on the basis of the data received from the host unit 130-1 or 130-2 to limit power supply to the controller section 110 and the engine section 120 in a sleep state except for power supply in the interface section 150, thereby further saving power.

In the second invention, the control means (IOP 111) controls power supply such that power supply from the power supply 140 to the controller 110 is started upon reception of a predetermined command from the host unit 130-1 or 130-2, and power supply from the power supply 140 to the controller section 110 is stopped upon reception of a predetermined command from the controller section 110. In accordance with a command from the host unit 130-1 or 130-2, the status of the printing apparatus main body 100-1 or 100-2 can be reversibly switched from the sleep state to the standby state or from the standby state to the sleep state.

In the third invention, the interface section 150 has an informing means for informing the status of the printing apparatus main body to the host unit. The informing means (IOP 111) of the interface section 150 informs the status of the printing apparatus main body to the host unit 130-1 or 130-2 such that the host unit 130-1 or 130-2 can properly determine the current printer status of the printing apparatus main body 100-1 or 100-2.

In the fourth invention, the interface section 150 communicates with the host unit 130-1 or 130-2 through a network. Upon reception of a command from any one of the host units 130-1 and 130-2, power supply to the controller section 110 and the engine section 120 in the sleep state can be limited except for power supply in the interface section 150, thereby further saving power.

In the fifth invention, in accordance with information from the interface section 150, the host unit 130-1 or 130-2 preferentially selects a printing apparatus whose printing apparatus main body 100-1 or 100-2 is set in the standby state before a printing apparatus in the sleep state, thereby determining a printing apparatus capable of performing printing processing as quickly as possible.

In the sixth invention, when the host unit 130-1 or 130-2 recognizes that a plurality of printing apparatuses whose printing apparatus main bodies 100-1 and 100-2 are set in the standby state are present, the host unit 130-1 or 130-2 sends a command for setting one of the printing apparatuses in the sleep state to the interface section. With this operation, regardless of changes in status of each printing apparatus, the printing apparatus main body 100-1 or 100-2 capable of performing printing processing can be determined as quickly as possible while printing apparatuses not subjected to printing are set in the sleep state.

In the seventh invention, the interface section 150 can be freely attached/detached to/from the printing apparatus main body 100-1 or 100-2, thereby coping with expansion or modification of the interface section 150.

In the eighth invention, the interface section 150 can be externally connected through the external interface port (not shown) of the printing apparatus main body 100-1 or 100-2, thereby externally expanding the function of the interface section to a conventional printing apparatus.

The engine section 120 of the apparatus of this embodiment will be described below.

Figure 2:
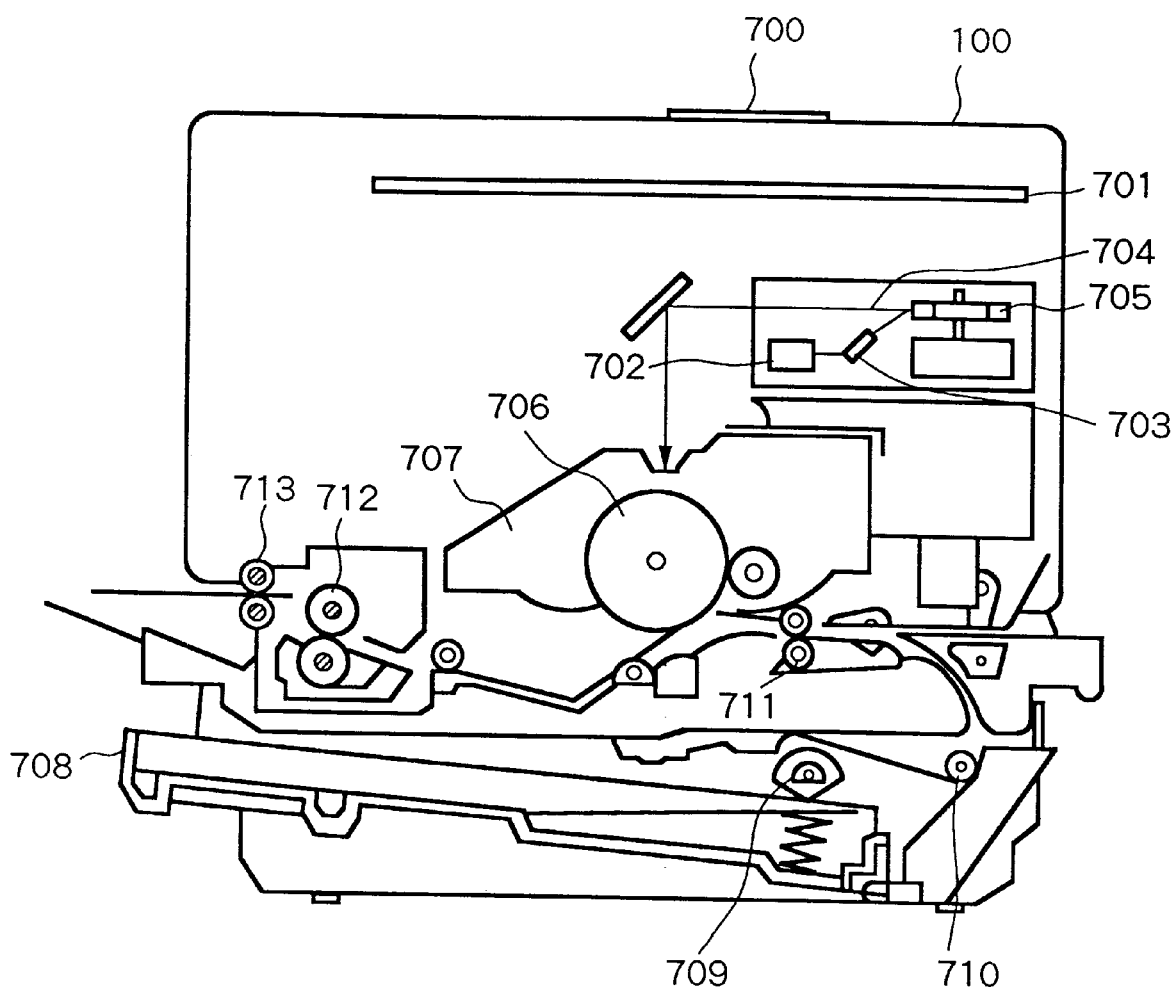
FIG. 2 is a sectional view for explaining an example of a printing apparatus shown in FIG. 1.

FIG. 2 is a sectional view for explaining an example of the printing section shown in FIG. 1, which corresponds to, e.g., the engine of a laser beam printer.

In the printer of this embodiment, character patterns or fixed formats (form data) can be registered from the host computer.

Referring to FIG. 2, reference numeral 100 denotes an apparatus main body. The apparatus main body 100 receives and stores character information (character code), form information, or a macro command supplied from the externally connected host computer, and at the same time prepares a corresponding character pattern or form pattern in accordance with the information, thereby forming an image on recording paper serving as a recording medium.

Reference numeral 700 denotes an operation panel having switches, an LCD display, and the like used for an operation. Reference numeral 701 denotes a printer control unit for controlling the entire apparatus main body 100 and analyzing character information and the like supplied from the host computer.

The printer control unit 701 mainly converts a character pattern corresponding to character information into a video signal and outputs this video signal to a laser driver 702. The printer control unit 701 corresponds to the printer controller section 110 shown in FIG. 1. The laser driver 702 is a circuit for driving a semiconductor laser 703, which turns on/off a laser beam 704 emitted from the semiconductor laser 703 in accordance with the received video signal. The laser beam 704 is deflected by a rotary polygon mirror 705 in the right and left directions and scanned on an electrostatic drum 706. With this operation, an electrostatic latent image such as a character pattern is formed on the electrostatic drum 706. This latent image is developed by a developing unit 707 around the electrostatic drum 706 and then transferred on recording paper.

As the recording paper, cut sheets are used. The cut sheets are stored in a sheet cassette 708 mounted in the LBP 100, carried into the apparatus by a feed roller 709 and convey rollers 710 and 711, and supplied onto the electrostatic drum 706. A toner image adhered on the electrostatic drum 706 by the developing unit 707 is transferred on the conveyed recording paper. Thereafter, the recording paper is conveyed toward a fixing unit 712, and the toner is fixed. Finally, the recording paper is discharged from the apparatus by a discharge roller 713.

Figure 9:
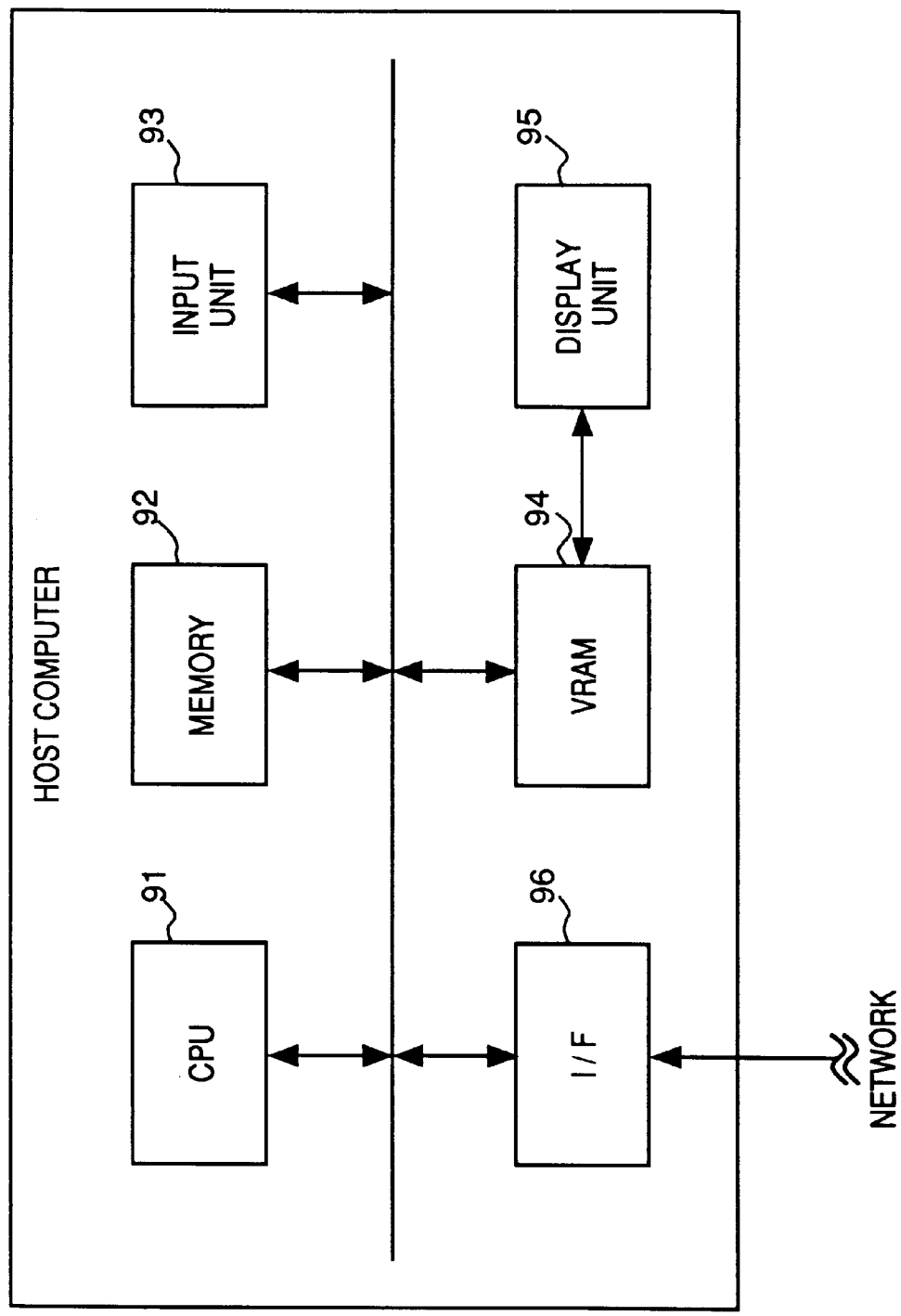
FIG. 9 is a block diagram of the host computer of the embodiments.

FIG. 9 is a block diagram of the host computer shown in FIG. 1.

The host computer has a CPU 91, a memory 92, an input unit 93 constituted by a keyboard, a mouse, and the like, a VRAM 94 for storing a display image, a display unit 95 for displaying the image developed by the VRAM 94, and an interface 96 for sending the printing data to the printing apparatus described in the above embodiment or receiving various information from the printing apparatus. As the interface 96, a printer interface capable of performing two-way communication or a network interface is used.

Programs based on flow charts in FIGS. 5, 6, and 8 (to be described later) are stored in the memory 92 and executed by the CPU 91.

<Description of Operation>

The operation of this embodiment in the above arrangement will be described below.

First of all, the operation processing of the CPU 114 of the controller section 110 of this embodiment will be described with reference to a flow chart in FIG. 3. A program based on this flow chart is stored in the ROM 115, as a matter of course.

Figure 3:
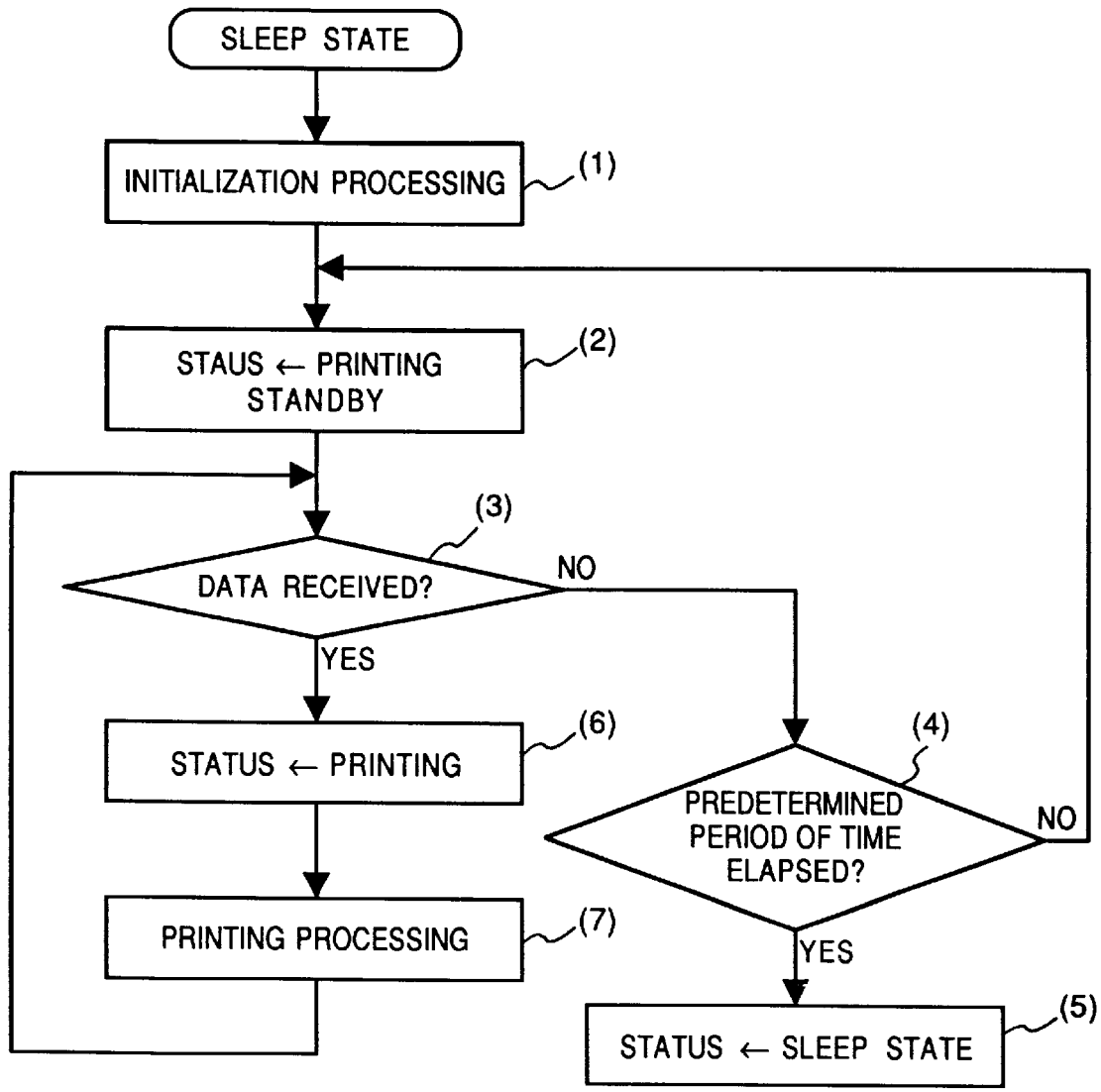
FIG. 3 is a flow chart showing an embodiment of the first power saving control method of the printing apparatus according to the present invention.

FIG. 3 is a flow chart showing an embodiment of the first power saving control method of the printing apparatus according to the present invention. Numbers (1) to (7) denote steps.

When the apparatus is powered on, the initialization processing of various peripheral circuits is performed in step (1). The flow advances to step (2) to write information representing a printing standby state at a predetermined address position (to be referred to as a status area hereinafter) in the RAM 116. Note that, upon reception of printing data, an interrupt signal is generated from the IOP 111 to the CPU 114 of interface section 150. The CPU 114 receives the printing data in this interrupt processing and performs writing processing of the data in a reception buffer ensured in the RAM 116.

The flow then advances to step (3) to determine whether the printing data is stored in the reception buffer. If NO in step (3), the flow advances to step (4) to determine whether a predetermined period of time has elapsed in a no-reception state. If it is determined that no data is received after that period of time has elapsed, information representing a sleep state is written in the status area of the RAM 116, and at the same time, a sleep command signal is generated to the IOP 111 of interface section 150 (step (5)).

Upon reception of this command, the IOP 111 of interface section 150 cuts off power supply to the CPU 114 connected to the bus 118, the remaining units, and the engine section 120 (to be described later in detail). Cutting off of the power itself is performed by, e.g., a relay switch, and a detailed description thereof will be omitted.

On the other hand, if YES in step (3), the flow advances to step (6) to write information representing the printing state in the status area. The flow advances to step (7) to perform printing processing on the basis of the received data.

As a result, three pieces of status information each indicating the printing standby state, the sleep state, and the printing state (busy state) are stored in the status area.

The control operation by the IOP 111 of interface section 150 shown in FIG. 1 will be described below with reference to FIG. 4.

Unlike the units connected to the bus 118, the IOP 111 and the RAM 116 receive power supply during the ON state of the main switch of the apparatus main body regardless of the sleep state.

Control processing performed by the IOP 111 is much simpler than that of the CPU 114 as a main unit. The circuits enabled for the operation are also limited, and the number of types of clocks and the like required for the operation can be largely reduced. For this reason, the power consumption can be reduced as compared to a case wherein power is supplied to the controller section 110.

Figure 4:
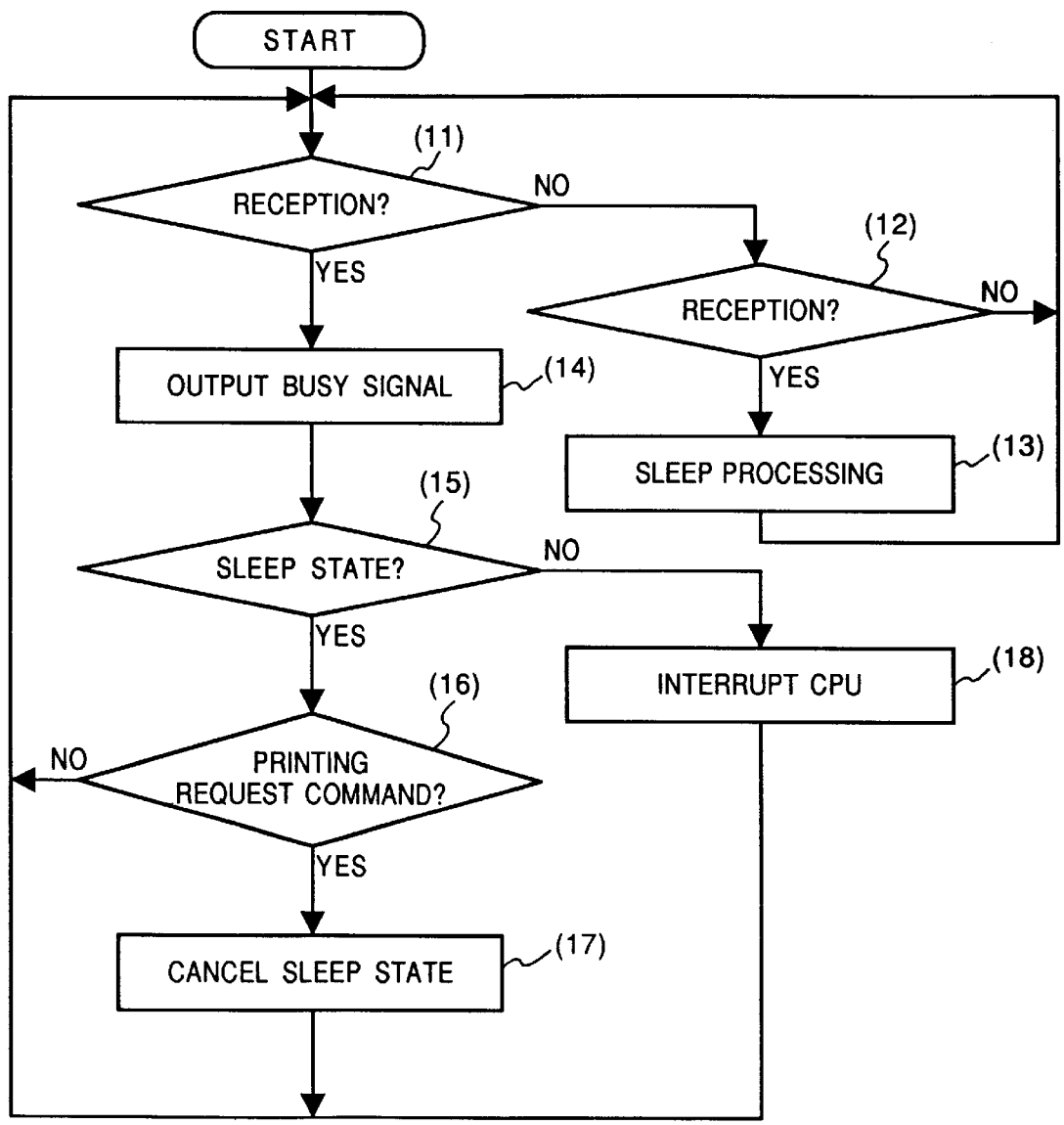
FIG. 4 is a flow chart showing an embodiment of the second power saving control method of the printing apparatus according to the present invention.

FIG. 4 is a flow chart showing an embodiment of the second power saving control method of the printing apparatus according to the present invention. Numbers (11) to (18) denote steps.

In step (11), it is determined whether data is received from the host computer connected to a LAN. If NO in step (11), the flow advances to step (12) to determine whether a sleep command is received from the controller section 110 (CPU 114). This loop of processing is repeatedly executed until data or sleep command is received.

In this loop, if it is determined that a sleep command is received from the CPU 114, power supply to all units connected to the bus 118 is stopped in step (13). At the same time, power to the engine section 120 is also stopped, and the sleep mode is set.

On the other hand, if YES in step (11), the flow advances to step (14) to acquire information in the status area of the RAM 116 (as described above, the RAM 116 receives power supply even in the sleep mode) and returns the information to the host computer (an ID for specifying the host computer is stored in the received data) as the data source. If the sleep state is set at that point of time, information representing the sleep state is sent to the host computer.

When the return processing of the status information is completed, the flow advances to step (15) to determine whether the apparatus main body is currently set in the sleep state. If NO, i.e., it is determined that the printing standby state is set, or the printing state is set on the basis of the printing data from the host computer, the flow advances to step (18) to interrupt the CPU 114, thereby causing the CPU 114 to perform interrupt processing (receiving processing).

On the other hand, if YES in step (15), the flow advances to step (16) to determine whether the received data is a printing request command. If NO in step (16), it is determined that the apparatus requests printing during the sleep state. Therefore, this request is ignored, and the flow returns to step (11).

If YES in step (16), the flow advances to step (17) to start power supply to the controller section 110, thereby canceling the sleep state.

With this operation, the CPU 114 of the controller section 110 starts processing based on the above-described flow chart in FIG. 3.

The printing data output processing of the host computer on the LAN will be described below with reference to the flow chart in FIG. 5.

Figure 5:
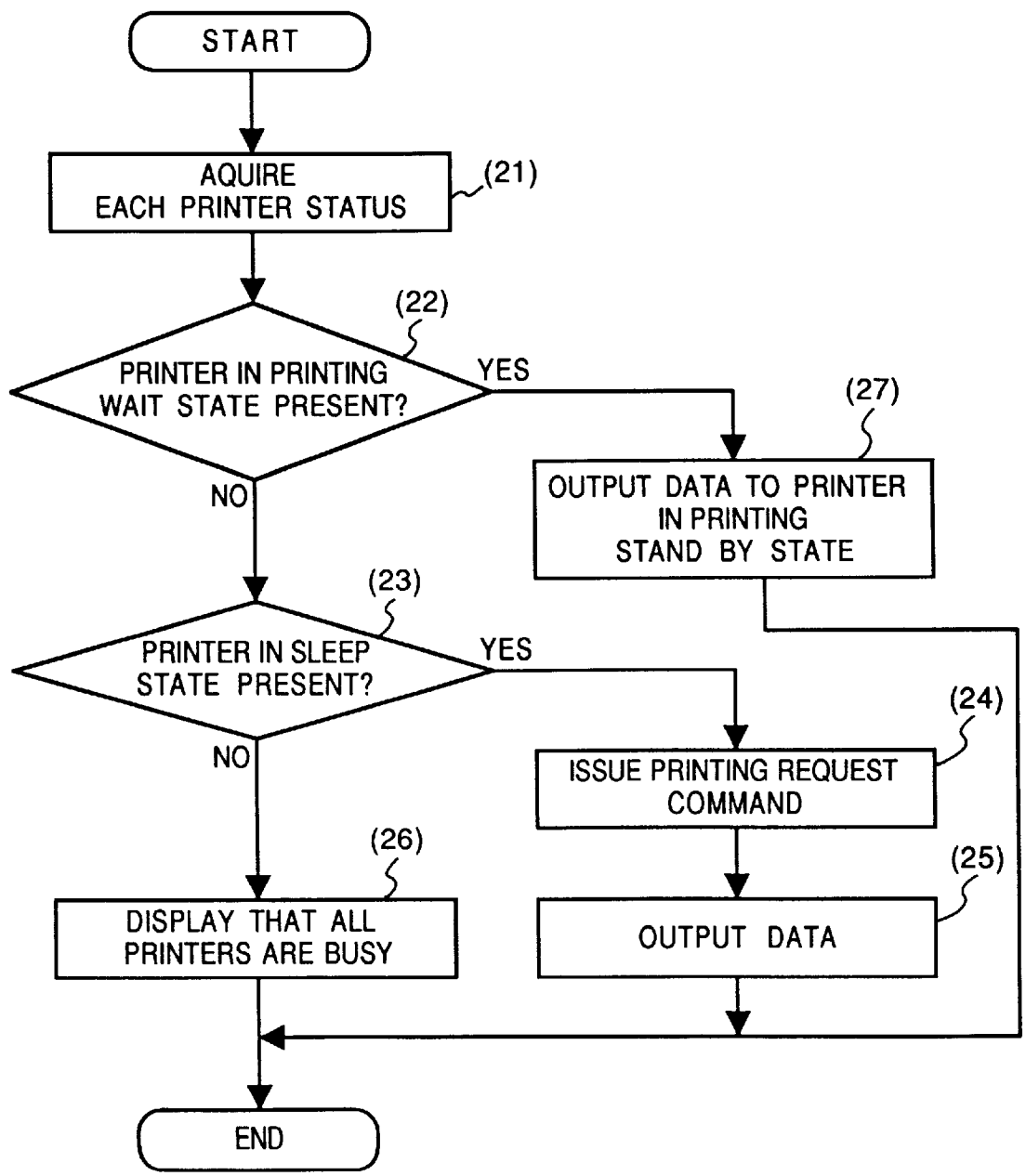
FIG. 5 is a flow chart showing an example of printing data output processing procedures in the printing apparatus according to the present invention.

A program based on the flow chart in FIG. 5 may be the OS or printer driver of the host computer, or may be executed using an application program. In this case, an example in which the program is adapted as a printer driver which operates on the host computer will be described. This program is stored in the memory 92 and executed by the CPU 91 (FIG. 9).

FIG. 5 is a flow chart showing an example of printing data output processing procedures in the printing apparatus according to the present invention. Numbers (21) to (27) denote steps.

In step (21), a predetermined command is generated to each printer connected to the LAN to obtain a printer status.

The flow advances to step (22) to determine whether a printer in the printing standby state is present. If YES in step (22), it is determined that the printer can immediately perform printing processing, so that printing data is output to the apparatus (step (27)). If a plurality of printers are set in the printing standby state, the printing data is output to a printer which is detected to be in the printing standby state first.

On the other hand, if NO in step (22), the flow advances to step (23) to determine whether a printer in the sleep state is present.

If YES in step (23), a printing request command is generated to the printer, thereby canceling the sleep state (step (24)) and outputting the printing data (step (25)). If a plurality of printers are set in the printing sleep state, the printing data is output to a printer which is detected to be in the sleep statefirst.

If NO in step (23), i.e., if it is determined that all printers are set in the printing state (representing that the printing processing for printing data from another host computer is in progress), information representing that all the printers on the network are "BUSY" is output (step (26)). The operator is notified at the host computer side that all the printers are set in the printing state and cannot be currently used. For example, a predetermined message is displayed on the display unit 95.

As described above, according to this embodiment, in the sleep state, power supply to the engine section is stopped, and additionally, power supply to most units of the controller section 110 is also stopped. Therefore, the power consumption can be reduced as compared to the prior art.

In addition, as for the operator of the host computer, since a printer in the printing standby state is preferentially selected before a printer in the sleep state, the operation environment of the system as a whole can be improved, and at the same time, power can also be effectively used in the system as a whole.

<Description of Second Embodiment>

In the above embodiment, the CPU 114 of the controller section 110 on the printing apparatus side determines whether or not the sleep mode should be set, and actual setting and canceling of the sleep mode is performed by the IOP 111. The host computer generates a printing request command to cancel the sleep mode.

However, the present invention is not limited to this. For example, setting of the sleep mode may also be designated by the host computer, or status information may be returned only when a status request command is generated.

In this case, if a host computer requests printing processing, and it is determined that two or more printers are in the printing standby state, except for one printer, all remaining printers can be set in the sleep state.

In addition, if one of a plurality of host computers serves as a printer server, and printing data generated by each host computer does not require immediate printing (a command representing non-urgency is added to the head of the data), the printing data can be output to only one printer.

In the above embodiment, if data is input to the interface section, information representing the sleep state is immediately transferred to the host computer. However, a control command for performing a similar operation as the conventional sleep state can also be used. The sleep state can be set on the printing apparatus side regardless of the control command.

<Description of Third Embodiment>

The third embodiment will be described below.

In the above embodiments, if a printing command is issued from an application operating on a host unit (host computer), printers in the printing standby state (printer which is in a non-printing state, and whose printer controller section and engine section are powered) is preferentially selected before printers in the sleep state. If printers in the printing standby state are present, one of them is automatically selected, and the printing data is sent to the selected printer.

However, in some cases, it is not preferable if a printer is automatically selected, and printing data is sent to the selected printer.

For example, if a large number of printers are connected to a network, and a selected printer is far from a host computer which sends printing data, the operator must attend to the printer which is located at a distant location to recover the printing output.

Therefore, it is preferable if an operator can select a printer. That is, if a plurality of printers in the same state are present, it is preferable if a printer can be freely selected therefrom.

In the third embodiment, the above object is realized.

Figure 6:
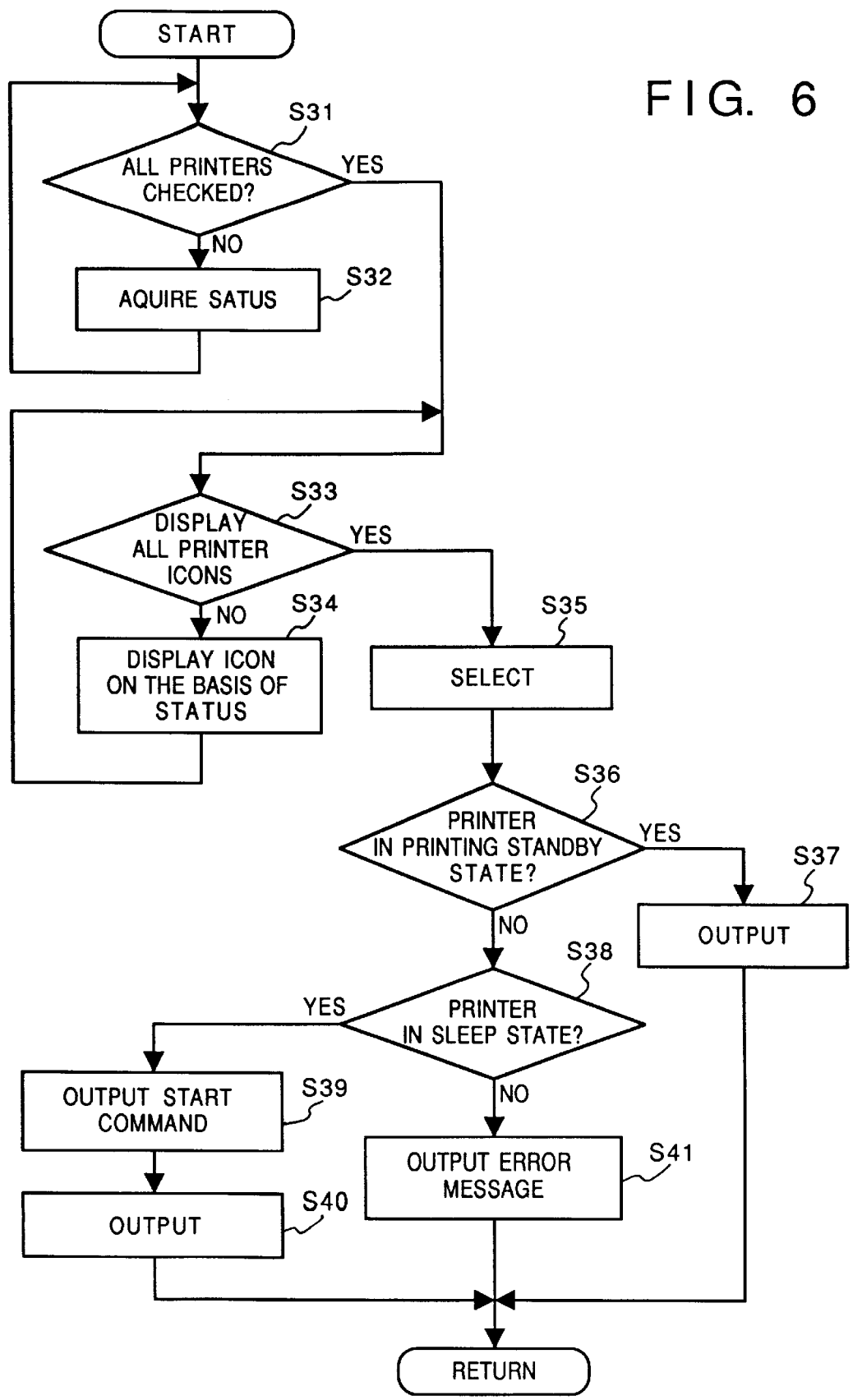
FIG. 6 is a flow chart showing printing processing procedures in a host computer of the third embodiment.

FIG. 6 is a flow chart showing part of the operation of a printer driver operating on a host computer, which is related to this embodiment. This processing is started in accordance with a printing command from an operator. As a matter of course, this program is stored in a memory 92 in the host computer as shown in FIG. 9 and executed by a CPU 91.

In step S31, it is determined whether the status is obtained for all the printers connected to the network through an I/F 96. If NO in step S31, the flow advances to step S32 to generate a status transmission request command to one printer, thereby obtaining the status of the printer.

Note that the printer in the third embodiment has the same arrangement as that described in the first embodiment. Therefore, even when predetermined data, e.g., command data for obtaining status information in this embodiment is sent to a printer, the printer in the sleep state is not set in the printing standby state. The obtained status information includes the printing standby state, the sleep state, and the printing state.

When the status is obtained for all the printers by repeatedly executing processing in steps S31 and S32, the flow advances to step S33.

In step S33, it is determined whether the icons of all printers are displayed on a display 95. If NO in step S33, the flow advances to step S34 to display an icon according to the status. As for all the printers, icons each corresponding to the status of a corresponding printer are displayed.

Figure 7:
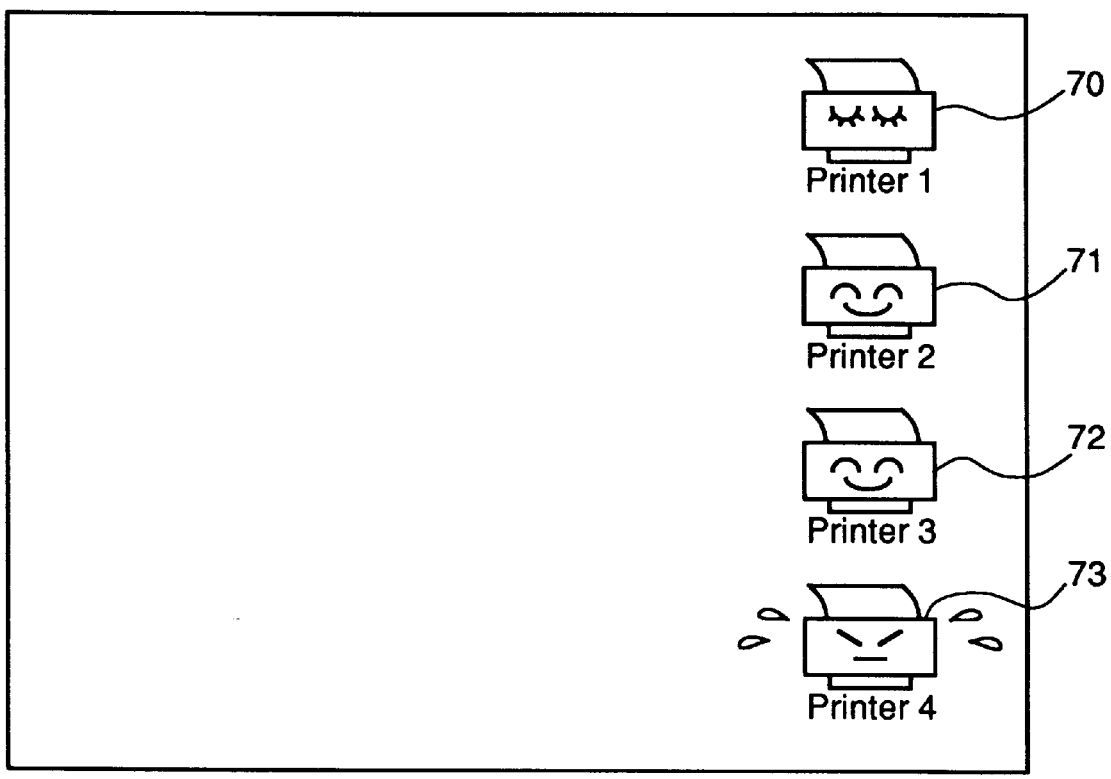
FIG. 7 is a view showing an example of a display screen in the host computer of the third embodiment.

FIG. 7 is a view showing an example in which a total of four printers are connected to the network. Reference numerals 70 to 73 denote printer icons. "PRINTER1 (ID or name on the network)" indicated by the icon 70 represents that the printer is currently set in the sleep state. The icons 71 and 72 represent the printing standby state, and the icon 73 represents the printing state. As a result, the operator can easily grasp the current state of each printer at a glance.

As shown in FIG. 7, when the status is displayed for all the printers, the flow advances to step S35 to wait until one of the printer icons is selected by a pointing device or the like constituting an input unit 93. If one of the printer icons is selected, the flow advances to step S36 to determine whether the selected printer icon represents the printing standby state. If YES in step S36, the flow advances to step S37 to output the printing data to the selected printer.

If a printer icon which does not represent the printing standby state is selected, the flow advances to step S38 to determine whether the printer status corresponding to the selected printer icon is the sleep state. If YES in step S38, the flow advances to step S39 to output a printing request command (described in the first embodiment) to the printer, and the printing data is output in step S40.

If it is determined that the selected printer represents neither the printing standby state nor the sleep state, i.e., the printer is currently set in the printing state, the flow advances to step S41 to display a message for informing that the selected printer cannot perform the printing operation.

As described above, according to the third embodiment of the present invention, when the host computer issues a printing command, the current status of each of a plurality of printers is visually indicated, and one of them is selected, thereby performing the printing operation in the printer desired by the operator.

If a large number of printers in the printing standby state are displayed, a pointing device or the like may be used to send a command for setting the printers in the sleep state.

<Description of Fourth Embodiment>

In the third embodiment, an example has been described in which all operable printers (printers at least whose main switches are in an ON state) on the network are displayed. That is, printers in the printing standby state and printers in the sleep state are simultaneously displayed together. Regardless of presence of printers in the printing standby state, a printer in the sleep state can be operated to perform the printing operation. From the viewpoint of a user interface, this method is excellent because the closest one of printers capable of printing can be selected. On the other hand, since a printer in the printing standby state is not always positively preferentially selected, the power consumption of the system as a whole cannot be suppressed.

In the fourth embodiment, when the printing operation is to be performed, an icon list of printers in the printing standby state is displayed, and a printer to which printing data is output is freely selected from these printers. If no printer in the printing standby state is present, a printer can be freely selected from printers in the sleep state.

Figure 8:
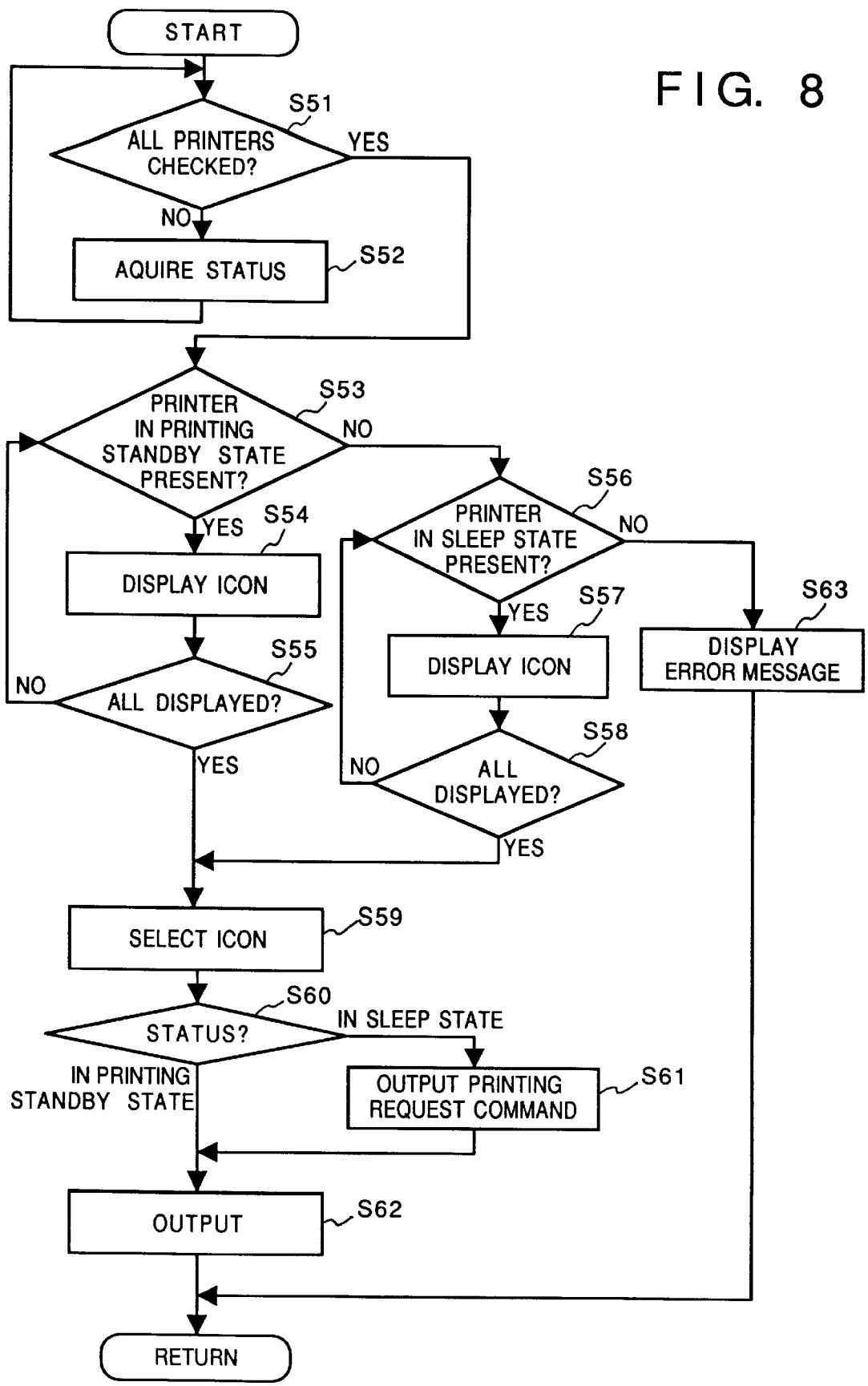
FIG. 8 is a flow chart showing printing processing procedures in the host computer of the fourth embodiment.

FIG. 8 is a flow chart showing the operation processing of a printer driver on a host computer in a host unit of the fourth embodiment. The printer has the same arrangement as that of the first embodiment. Additionally, a program corresponding to this flow chart is stored in a memory 92 and executed by a CPU 91.

In step S51, it is determined whether the status is obtained for all the printers connected to the network. If NO in step S51, the flow advances to step S52 to generate a status transmission request command to one printer, thereby obtaining the status of the printer.

When the status is obtained for all the printers, the flow advances to step S53 to determine whether a printer in the printing standby state is present.

If YES in step S53, an icon corresponding to the printer in the printing standby state is displayed on a display unit 95 of the host computer in steps S54 and S55. When at least one printer is set in the printing standby state, the icons of printers in the sleep state are not displayed.

If NO in step S53, the flow advances to step S56 to determine whether a printer in the sleep state is present. If YES in step S56, an icon corresponding to the printer in the sleep state is displayed in steps S57 and S58.

In either case, if printer icons are displayed, the flow advances to step S59 to select one of the displayed icons using a pointing device of an input unit 93.

In step S60, the status of the printer corresponding to the selected icon is determined. If a printer in the sleep state is selected, the flow advances to step S61 to output a printing request command to the printer, thereby setting the printer in the printing standby state.

In step S62, printing data is output to the printer, thereby ending this processing.

If no printer in the printing standby state and in the sleep state is present, a message for informing that the printing operation cannot be performed is displayed in step S63, thereby ending this processing.

As described above, according to the fourth embodiment, printers in the printing standby state are preferentially selected, and a desired printer can be selected from the printers in the printing standby state. Therefore, the power consumption of the system as a whole can be suppressed as compared to the third embodiment.

In the third embodiment, an error message is displayed when a printing command is generated to a printer in the printing state. In the fourth embodiment, an error message is displayed when no printer in the printing standby state and in the sleep state is present.

However, when a printing operation is to be performed through the network, the printing operation is performed through a printer server, as is well known, and the printing data is generally supplied to the printer server. Therefore, if a printer server is used, the printing data may be sent to the printer server. Even if the desired printer is set in the printing state, the printing data may be set in a printing queue. In this case, however, the operator must realize that the printing output is going to be obtained with a slight delay.

In the first to fourth embodiments, the host unit (host computer) directly outputs a status information transmission command to the printer. However, if a printer server is used, the command may be output to the printer server. Upon reception of the command, the printer server acquires the current status of the corresponding printer and informs the status to the inquiring host computer.

In the above embodiments, the interface section is incorporated in the printing apparatus. However, the present invention can also be applied to an interface section which can be externally expanded.

In a recent printing apparatus, particularly in a printing apparatus designed for use in a network environment, a plurality of interface circuits are often provided. In addition, to cope with a larger number of interfaces, some printing apparatuses have an expandable interface circuit.

As described above, when the interface circuit in the present invention is externally expanded, power savings control is enabled in various types of interfaces. The type of an interface can be changed in the future only by changing the expandable interface circuit applicable to the present invention.

In addition, in the above embodiments, a laser beam printer is exemplified as a printing apparatus. However, these embodiments can also be applied to another apparatus using an electrophotography system such as an LED printer, as a matter of course. Furthermore, the present invention can also be applied to, e.g., a wire-dot or thermal transfer system although no dramatic effect cannot be expected as for reduction in power consumption. The effect is increased especially in an office having relatively large power consumption.

The above embodiments refer to only the sleep state of the printing apparatus. However, the present invention can be applied to a host computer having the sleep state. If the present invention is applied to another network resource, lower power consumption control of the network as a whole can be performed.

If the present invention is applied to the host computer, the effect of reduction of power consumption in the host computer can be obtained. Additionally, when a computer load is used to manage the status information, an effect of dispersing the computer load can also be obtained.

Therefore, the present invention may be applied to a system constituted by a plurality of equipments or an apparatus constituted by one equipment. The present invention can also be applied to a system or apparatus to which a program is supplied, as a matter of course.

As has been described above, according to the above embodiments, although the arrangement of the apparatus is slightly complicated as compared to the prior art, power consumption in the sleep state can be reduced as compared to the prior art. In consideration of the network environment, when this control method is applied to other resources, the network resource can be efficiently utilized.

As described above, according to the first invention according to the present invention, the control means of the interface section controls power supply from the power supply to the controller section and the engine section on the basis of data received from the host unit to limit power supply to the controller section and the engine section in the sleep state except for power supply in the interface section, thereby further saving power.

According to the second invention, the control means controls power supply such that power supply from the power supply to the controller section is started upon reception of a predetermined command from the host unit, and power supply from the power to the controller section is stopped upon reception of a predetermined command from the controller section. In accordance with a command from the host unit, the state of the printing apparatus can be reversibly switched from the sleep state to the standby state or from the standby state to the sleep state.

According to the third invention, the informing means of the interface section informs the status of the printing apparatus main body to the host unit such that the host unit can properly determine the current printer status of the printing apparatus.

According to the fourth invention, the interface section communicates with the host unit through a network. Upon reception of a command from any one of the host units, power supply to the controller section and the engine section in the sleep state can be limited except for power supply in the interface section, thereby further saving power.

According to the fifth invention, in accordance with information from the interface section, the host unit preferentially selects a printing apparatus whose printing apparatus main body is set in the standby state before a printing apparatus in the sleep state, thereby determining a printing apparatus capable of performing printing processing as quickly as possible.

According to the sixth invention, when the host unit recognizes that a plurality of printing apparatuses whose printing apparatus main bodies are set in the standby state are present, the host unit sends a command for setting one of the printing apparatuses in the sleep state to the interface section. With this operation, regardless of changes in status of each printing apparatus, a printing apparatus capable of performing printing processing can be determined as quickly as possible while printing apparatuses not subjected to printing are set in the sleep state.

According to the seventh invention, the interface section can be freely attached/detached to/from the printing apparatus main body, thereby coping with expansion or modification of the interface section.

According to the eighth invention, the interface section can be externally connected through the external interface port of the printing apparatus main body, thereby externally expanding the function of the interface section to a conventional printing apparatus.

Therefore, power supply to the controller section and the printer engine section, both of which have a large power loss, is controlled while the printer apparatus itself further reduces the power consumption in the sleep state, and at the same time, the communication state with the host unit can be ensured.

As many apparently widely different embodiments of the present invention can be made without departing from the spirit and scope thereof, it is to be understood that the invention is not limited to the specific embodiments thereof except as defined in the appended claims.

What is claimed is:

1. A printing system comprising:

a printing apparatus comprising a controller section for generating a printing image based on printing data sent from a host unit through an interface section which performs data communication with the host unit, and an engine section for recording the printing image from said controller section on a predetermined recording medium; and a host computer capable of connecting a plurality of printing apparatuses and serving as said host unit for transmitting the printing data to one of said printing apparatuses, said interface section connected to said printing apparatus comprising:

power supply control means for receiving power supply while a power supply switch of said printing apparatus is in an ON state, and controlling power supply to said controller section and said engine section on the basis of data received from said host unit; and output means for independently outputting status information regarding said printing apparatus to said host unit, said host computer comprising:

reception means for receiving the status information of each of said printing apparatuses connected to said host computer; and output-destination control means for determining a printing apparatus, to which the printing data is to be output, on the basis of the received status information, wherein said output-destination control means comprises:

identifying means for identifying either a printing apparatus in a sleep state where power supply to said controller section and said engine section is stopped or a printing apparatus in a print-ready state where power is supplied to said controller section and said engine section;

display control means for controlling displaying of the printing apparatuses which are identified as the print-ready state or the sleep state by said identifying means;

selection means for selecting a printing apparatus from the displayed printing apparatuses displayed by said display control means as an output destination; and output means for outputting the printing data to the selected printing apparatus.

2. A printing apparatus, connected to a network, comprising:

interface means for performing data communication with a host unit;

memory means for storing status information regarding said printing apparatus; and control means for controlling said printing apparatus to generate a printing image based on printing data sent from the host unit through said interface means and for writing the status information in said memory means, wherein said interface means, responding to a request from said host unit, informs the host unit of the status information stored in said memory means without intervention of said control means.

3. The apparatus according to claim 2, wherein said interface means further comprises:

determination means for determining a type of data received from the host unit, wherein, when said determination means determines that the data received from the host unit is a control command asking for the status information, said interface means informs the host unit of the status information without notifying said control means.

4. The printing apparatus according to claim 3, wherein when said determination means determines that the data received from the host unit is not the control command, the received data is transmitted to said control means.

5. The apparatus according to claim 2, wherein said interface means communicates with a plurality of host units through the network.

6. The apparatus according to claim 2, wherein the host unit preferentially selects said printing apparatus over another printing apparatus in a sleep state when the status information indicates that said printing apparatus is in a print-ready state.

7. The apparatus according to claim 2, wherein said interface means can be freely attached/detached to/from said printing apparatus.

8. The apparatus according to claim 2, wherein said interface means can be externally connected through an external interface port of said printing apparatus.

9. The printing apparatus according to claim 2, wherein said memory means is accessible by said control means and said interface means.

10. The printing apparatus according to claim 2, wherein said status information indicates a sleep state when power to said control means and an engine section for forming an image is off, or a print-ready state where power is supplied to said control means and the engine section.

11. A printing apparatus, connected to a network, comprising:

interface means for performing data communication with a host unit;

control means for controlling said printing apparatus to generate a printing image based on printing data sent from the host unit through said interface means; and memory means for storing status information regarding said printing apparatus, wherein said interface means informs the host unit of the status information stored in said memory means without a control operation of said control means to inform the host unit of the status information, and further comprising power supply means for always supplying power to said interface means while a power supply switch is in an ON state, and said interface means further comprising power supply control means for controlling power supplied from said power supply means to said control means, in accordance with the data received from the host unit, wherein said power supply control means stops power supply to said control means on the basis of a power consumption reduction signal from the host unit.

12. A printing apparatus, connected to a network, comprising:

interface means for performing data communication with a host unit;

control means for controlling said printing apparatus to generate a printing image based on printing data sent from the host unit through said interface means; and memory means for storing status information regarding said printing apparatus, wherein said interface means informs the host unit of the status information stored in said memory means without a control operation of said control means to inform the host unit of the status information, and wherein, when the host unit recognizes a plurality of printing apparatuses having a same structure as said printing apparatus whose status information regarding the respective printing apparatus indicates a print-ready state, said host unit sends a command for setting one of the printing apparatuses in the sleep state to the respective interface means.

13. A printing system comprising:

a printing apparatus comprising:

interface means for performing data communication with a host unit;

memory means for storing status information regarding said printing apparatus;

control means for controlling said printing apparatus to generate a printing image based on printing data sent from the host unit through said interface means, and for writing the status information in said memory means, a host computer for connecting to a plurality of printing apparatuses including said printing apparatus, each of the plurality of printing apparatuses having a same structure as said printing apparatus, said host computer comprising:

request means for sending a request to each of the plurality of printing apparatuses to send the respective status information to said host computer;

reception means for receiving the status information of each of the plurality of printing apparatuses; and transmitting means for transmitting the printing data to one of the plurality of printing apparatuses, wherein said interface means, responding to said request from said host computer, informs said host computer of the status information stored in said memory means without intervention of said control means.

14. The system according to claim 13, wherein said host computer includes:

display control means for controlling displaying of identification information of each of the plurality of printing apparatuses in a form based on the status information of each of the plurality of printing apparatuses, which is received by said reception means;

selecting means for manually selecting one of the displayed identification information of the plurality of printing apparatuses; and output means for outputting the printing data to a printing apparatus corresponding to the selected identification information.

15. The system according to claim 13, wherein said interface means includes means for outputting the status information at that point of time to said host computer upon reception of the predetermined command data from said host computer.

16. The system according to claim 13, wherein the status information indicates one of a print-ready state in which power is supplied to said control means, a sleep state in which power supply to said control means is stopped, and a printing state.

17. The system according to claim 13, wherein said printing apparatus and said host computer are connected via a network.

18. The printing system according to claim 13, wherein said memory means is accessible by said control means and said interface means.

19. The printing system according to claim 13, wherein said status information indicates a sleep state when power to said control means and an engine section for forming an image is off, or a print-ready state where power is supplied to said control means and the engine section.

20. A printing system comprising:

a printing apparatus comprising:

interface means for performing data communication with a host unit;

control means for controlling said printing apparatus to generate a printing image based on printing data sent from the host unit through said interface means; and memory means for storing status information regarding said printing apparatus, and a host computer capable of connecting to a plurality of printing apparatuses including said printing apparatus, each of the plurality of printing apparatuses having a same structure as said printing apparatus, said host computer comprising:

request means for requesting the respective status information from the plurality of printing apparatuses;

reception means for receiving the status information of each of the plurality of printing apparatuses; and transmitting means for transmitting the printing data to one of the plurality of printing apparatuses, wherein said interface means informs said host computer of the status information without a control operation of said control means for informing said host computer of the status information, wherein said interface means is a two-way communication interface; and a power supply control means of said interface means controls power supply to said control means in accordance with predetermined command data from said host computer.

21. An information processing apparatus which serves as a host unit for connecting to a plurality of printing apparatuses, each including internal devices, that are set in a power consumption reduction mode upon being set in a predetermined status and output status information to said host unit, comprising:

reception means for receiving the status information regarding each of the printing apparatuses via a network; and output-destination control means for determining one of the printing apparatuses, to which printing data is to be output, on the basis of the received status information, wherein said output-destination control means comprises:

identifying means for identifying each of the plurality of printing apparatuses as being either in a sleep state where power supply to the devices of the respective printing apparatus is reduced, or in a print-ready state where power is supplied to the devices of the respective printing apparatus;

display control means for controlling a display so that printing apparatuses in the sleep state and printing apparatuses in the print-ready state are displayed in a distinct fashion from each other;

selection means for selecting one of the plurality of printing apparatuses from the display as an output destination; and output means for outputting the printing data to the selected printing apparatus.

22. The apparatus according to claim 21, wherein said selection means manually selects one of the displayed printing apparatuses.

23. The apparatus according to claim 21, wherein the plurality of printing apparatuses and said host unit are connected via a network.

24. An information processing apparatus which serves as a host unit capable of connecting to a plurality of printing apparatuses, each including internal devices, that are set in a power consumption reduction mode upon being set in a predetermined status and output status information to said host unit, comprising:

reception means for receiving the status information regarding each of the printing apparatuses; and output-destination control means for determining one of the printing apparatuses, to which printing data is to be output, on the basis of the received status information, wherein said output-destination control means comprises:

identifying means for identifying each of the plurality of printing apparatuses as being either in a sleep state where power supply to the devices of the respective printing apparatus is reduced, or in a print-ready state where power is supplied to the devices of the respective printing apparatus;

display control means for controlling a display indicating which of the printing apparatuses are in the sleep state and which are in the print-ready state;

selection means for selecting one of the plurality of printing apparatuses from the display as an output destination; and output means for outputting the printing data to the selected printing apparatus, wherein each of the plurality of printing apparatuses comprises:

an interface section for connecting the printing apparatus to said host unit; and a controller section for generating a printing image based on the printing data sent from said host unit through the interface section, and an engine section for recording the printing image from the controller section on a predetermined recording medium, said interface section comprising:

power supply control means for receiving power supply while a power switch of the printing apparatus is in an ON state, and for controlling power supply to the controller section and the engine section on the basis of data received from said host unit; and output means for independently outputting the status information of the printing apparatus to said host unit.

25. The apparatus according to claim 24, wherein the interface means is a two-way communication interface.

26. The apparatus according to claim 24, wherein the power supply control means includes means for outputting the status information regarding the printing apparatus at that point of time through the interface means to said host unit upon reception of predetermined command data from said host unit.

27. The apparatus according to claim 24, wherein the status information indicates one of a print-ready state in which power is supplied to the printer controller section and the engine section, a sleep state in which power supply to the printer controller section and the engine section is stopped, and a printing state.

28. An interface apparatus, which is included in a printing apparatus having a control means for controlling internal devices of the printing apparatus, and which is connected to a network, comprising:

reception means for receiving data from a host unit via the network;

determination means for determining whether or not the data received by said reception means is a request of status information regarding said printing apparatus; and informing means, in a case where said determination means determines that the received data is a status request, for informing status information written in a predetermined memory means by said control means, to the host unit without intervention of the control means for informing the host unit of the status information.

29. The interface apparatus according to claim 28, further comprising the memory for storing the status information.

30. The interface apparatus according to claim 29, wherein said memory is a non-volatile RAM.

31. The interface apparatus according to claim 28, wherein said interface apparatus is removably integrated in the printing apparatus.

32. The interface apparatus according to claim 28, wherein the status information indicates one of a print-ready state in which power is supplied to the control means and the engine section, a sleep state in which power supply to the control means and the engine section is stopped, and a printing state.

33. The interface apparatus according to claim 28, further comprising transmitting means for transmitting the data received by said reception means to the control means when said determination means determines that the data received by said reception means is not a control command asking for status information regarding the printing apparatus.

34. The interface apparatus according to claim 28, wherein said memory means is accessible by said control means and said interface means.

35. The interface apparatus according to claim 28, wherein said status information indicates a sleep state when power to said control means and an engine section for forming an image is off, or a print-ready state where power is supplied to said control means and the engine section.

36. An interface apparatus, which is included in a printing apparatus having a control means for controlling internal devices of the printing apparatus, and which is connected to a network, comprising:
reception means for receiving data from a host unit:
determination means for determining whether or not predetermined data is received by said reception means;
informing means for informing status information, regarding the printing apparatus and that is stored in a predetermined memory means, to the host unit without a control operation of the control means for informing the host unit of the status information; and
controlling means for controlling power supply from a power supply to the control means and to an engine section of the printing apparatus, in accordance with the data received from the host unit.

37. A print control method for controlling an information processing apparatus which serves as a host unit for connecting to a plurality of printing apparatuses, each including internal devices, that are set in a power consumption reduction mode upon being set in a predetermined status and output status information to the host unit, comprising the steps of:
receiving the status information regarding each of the printing apparatuses via a network; and
determining one of the printing apparatuses, to which printing data is to be output, on the basis of the received status information,
wherein said determining step comprises the steps of:
identifying each of the plurality of printing apparatuses as being either in a sleep state where power supply to the devices of the respective printing apparatus is reduced, or in a print-ready state where power is supplied to the devices of the respective printing apparatus;
controlling a display so that printing apparatuses in the sleep state and printing apparatuses in the print-ready state are displayed in a distinct fashion from each other;
selecting one of the plurality of printing apparatuses from the display as an output destination; and
outputting the printing data to the selected printing apparatus.

38. The print control method according to claim 37, wherein when it is identified in said identifying step that there is a printing apparatus in the print-ready state, the print-ready printing apparatus is preferentially selected over a printing apparatus in the sleep state in said selecting step.

39. A print control method for controlling an information processing apparatus which serves as a host unit capable of connecting to a plurality of printing apparatuses, each including internal devices, that are set in a power consumption reduction mode upon being set in a predetermined status and output status information to the host unit, comprising the steps of:
receiving the status information regarding each of the printing apparatuses; and
determining one of the printing apparatuses, to which printing data is to be output, on the basis of the received status information,
wherein said determining step comprises the steps of:
identifying each of the plurality of printing apparatuses as being either in a sleep state where power supply to the devices of the respective printing apparatus is reduced, or in a print-ready state where power is supplied to the devices of the respective printing apparatus;
controlling a display indicating which of the printing apparatuses are in the sleep state and which are in the print-ready state;
selecting one of the plurality of printing apparatuses from the display as an output destination; and
outputting the printing data to the selected printing apparatus, and
further comprising the step of, when a plurality of printing apparatuses in the print-ready state are identified in said identifying step, sending a command setting one of the printing apparatuses in the sleep state.

40. A computer readable storage medium storing a printer control program for controlling an information processing apparatus which serves as a host unit for connecting to a plurality of printing apparatuses, each including internal devices, that are set in a power consumption reduction mode upon being set in a predetermined status and output status information to the host unit, said program comprising the steps of:
receiving the status information regarding each of the printing apparatuses via a network; and
determining one of the printing apparatuses, to which printing data is to be output, on the basis of the received status information,
wherein said determining step comprises the steps of:
identifying each of the plurality of printing apparatuses as being either in a sleep state where power supply to the devices of the respective printing apparatus is reduced, or in a print-ready state where power is supplied to the devices of the respective printing apparatus;
controlling a display so that printing apparatuses in the sleep state and printing apparatuses in the print-ready state are displayed in a distinct fashion from each other;
selecting one of the plurality of printing apparatuses from the display as an output destination; and
outputting the printing data to the selected printing apparatus.

41. The storage medium according to claim 40, wherein when it is identified in said identifying step that there is a printing apparatus in the print-ready state, the print-ready printing apparatus is preferentially selected over a printing apparatus in the sleep state in said selecting step.

42. A computer readable storage medium storing a printer control program for controlling an information processing apparatus which serves as a host unit capable of connecting to a plurality of printing apparatuses, each including internal devices, that are set in a power consumption reduction mode upon being set in a predetermined status and output status information to the host unit, said program comprising the steps of:

receiving the status information regarding each of the printing apparatuses; and determining one of the printing apparatuses, to which printing data is to be output, on the basis of the received status information, wherein said determining step comprises the steps of:

identifying each of the plurality of printing apparatuses as being either in a sleep state where power supply to the devices of the respective printing apparatus is reduced, or in a print-ready state where power is supplied to the devices of the respective printing apparatus;

controlling a display indicating which of the printing apparatuses are in the sleep state and which are in the print-ready state;

selecting one of the plurality of printing apparatuses from the display as an output destination; and outputting the printing data to the selected printing apparatus, wherein said program further comprises the step of, when a plurality of printing apparatuses in the print-ready state are identified in said identifying step, sending a command to the interface section for setting one of the printing apparatuses in the sleep state.

43. A print control method of controlling an interface section in a printing apparatus connected to a network via the interface section, the printing apparatus including a controlling section for generating a print image based on print date sent from a host unit via the network through the interface section, said method comprising the steps of:

storing status information regarding the printing apparatus; and informing, in a case where it is determined that the received data is a status request, the host unit of the status information stored in said storing step without a control operation by the controlling section for informing the host unit of the status information.

44. The print control method according to claim 13, wherein said memory means is accessible by said control means and said interface means.

45. The print control method according to claim 43, wherein said status information indicates a sleep state when power to said control means and an engine section for forming an image is off, or a print-ready state where power is supplied to said control means and the engine section.

46. A computer readable storage medium for storing a print control method of controlling an interface section in a printing apparatus connected to a network via the interface section, the printing apparatus including a controlling section for generating a print image based on print date sent from a host unit via the network through the interface section, said method comprising the steps of:

storing status information regarding the printing apparatus; and informing, in a case where it is determined that the received data is a status request, the host unit of the status information stored in said storing step without a control operation by the controlling section for informing the host unit of the status information.

47. The computer readable storage medium according to claim 46, wherein said memory means is accessible by said control means and said interface means.

48. The computer readable storage medium according to claim 46, wherein said status information indicates a sleep state when power to said control means and an engine section for forming an image is off, or a print-ready state where power is supplied to said control means and the engine section.

49. A control method of controlling a printing apparatus connected to a host unit via a network, comprising the steps of:

receiving data from the host unit;

determining whether or not predetermined data is received in said receiving step;

controlling said printing apparatus to generate a printing image based on printing data sent from the host unit through an interface means and writing the status information a memory means; and informing the host unit in response to a request from the host unit of status information regarding the printing apparatus, stored in a predetermined memory means, without intervention of a control means, that controls devices of the printing apparatus.

50. The control method according to claim 49, wherein said memory means is accessible by said control means and said interface means.

51. The control method according to claim 49, wherein said status information indicates a sleep state when power to said control means and an engine section for forming an image is off, or a print-ready state where power is supplied to said control means and the engine section.

52. A computer readable storage medium for storing a control method of controlling a printing apparatus connected to a host unit via a network, said method comprising the steps of:

receiving data from the host unit;

determining whether or not predetermined data is received in said receiving step;

controlling said printing apparatus to generate a printing image based on printing data sent from the host unit through an interface means and writing the status information a memory means; and informing the host unit in response to a request from the host unit of status information regarding the printing apparatus, stored in a predetermined memory means, without intervention of a control means, that controls devices of the printing apparatus.

53. The computer readable storage medium according to claim 52, wherein said memory means is accessible by said control means and said interface means.

54. The computer readable storage medium according to claim 52, wherein said status information indicates a sleep state when power to said control means and an engine section for forming an image is off, or a print-ready state where power is supplied to said control means and the engine section.

* * * * *

UNITED STATES PATENT AND TRADEMARK OFFICE
CERTIFICATE OF CORRECTION

PATENT NO. : 5,937,148

DATED : August 10, 1999

INVENTOR(S) : TAKASHI OKAZAWA

Page 1 of 3

It is certified that error appears in the above-identified patent and that said Letters Patent is hereby corrected as shown below:

SHEET 3

Figure 3, "STAUS" should read --STATUS--.

SHEET 5

Figure 5, "AQUIRE" should read --ACQUIRE--.

SHEET 6

Figure 6, "AQUIRE" should read --ACQUIRE--.

SHEET 8

Figure 8, "AQUIRE" should read --ACQUIRE--.

COLUMN 8

Line 55, "statefirst." should read --state first.--.

COLUMN 12

Line 27, "cannot" should read --can--.

UNITED STATES PATENT AND TRADEMARK OFFICE
CERTIFICATE OF CORRECTION

PATENT NO. : 5,937,148

DATED : August 10, 1999

INVENTOR(S) : TAKASHI OKAZAWA

It is certified that error appears in the above-identified patent and that said Letters Patent is hereby corrected as shown below:

COLUMN 15

Line 13, "where" should read --when--.

COLUMN 16

Line 53, "where" should read --when--.

COLUMN 19

Line 23, "where" should read --when--.

COLUMN 21

Line 40, "date" should read --data--.
   Line 50, "claim 13," should read --claim 43,--.
   Line 56, "where" should read --when--.
   Line 62, "date" should read --data--.

UNITED STATES PATENT AND TRADEMARK OFFICE
CERTIFICATE OF CORRECTION

PATENT NO. : 5,937,148

DATED : August 10, 1999

INVENTOR(S) : TAKASHI OKAZAWA

It is certified that error appears in the above-identified patent and that said Letters Patent is hereby corrected as shown below:

<u>COLUMN 22</u>

```
Line 13, "where" should read --when--.
Line 25, "information" should read --information in--.
Line 50, "information" should read --information in--.
Line 63, "where" should read --when--.
```

Signed and Sealed this

Twenty-fifth Day of April, 2000

Attest:

Q. TODD DICKINSON

*Attesting Officer*         *Director of Patents and Trademarks*